May 11, 1926.
W. WAIT, JR
1,584,053
ENGINE BED MOUNTING
Filed June 14, 1924
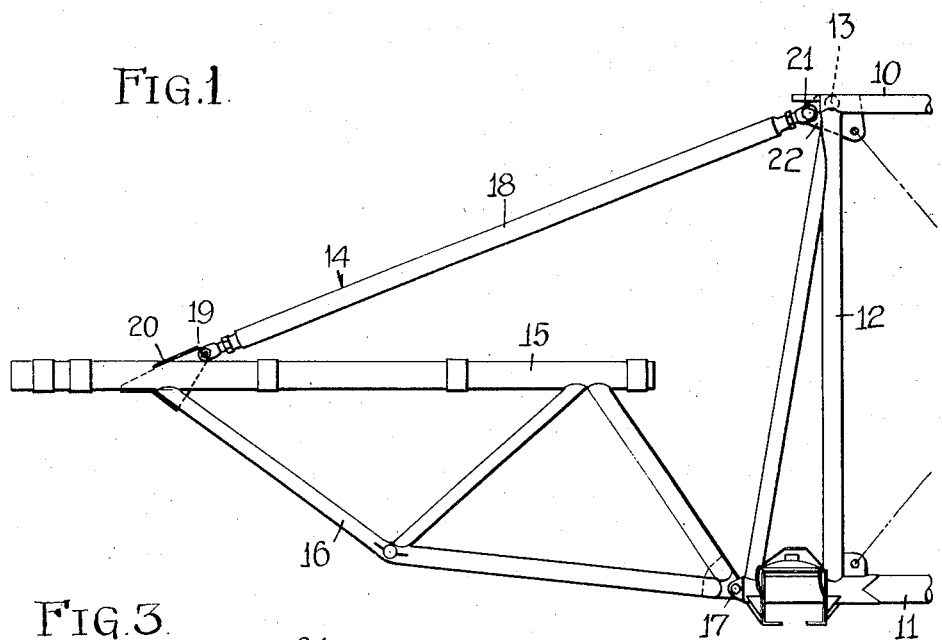
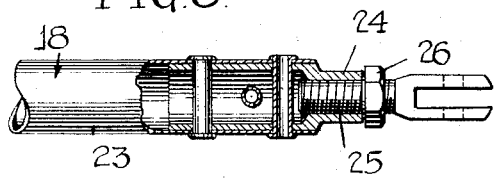
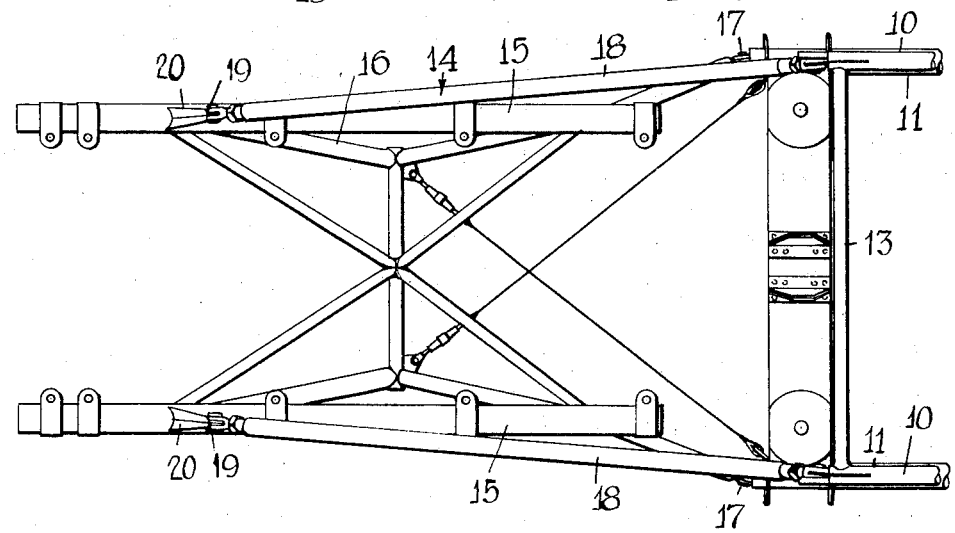
INVENTOR
WILLIAM WAIT JR.
BY
ATTORNEY Patented May 11, 1926.

1,584,053

UNITED STATES PATENT OFFICE.

WILLIAM WAIT, JR., OF GARDEN CITY, NEW YORK, ASSIGNOR TO CURTISS AEROPLANE & MOTOR CORPORATION, A CORPORATION OF NEW YORK.

ENGINE-BED MOUNTING.

Application filed June 14, 1924. Serial No. 719,974.

My invention relates to engine mountings and more particularly to engine mountings in which the engine bed is adjustable relatively to that part or portion of the structure of which the engine mounting forms a part.

In aeroplane structures it is the common practice to so mount the engine bed or bearers with respect to the aeroplane fuselage or other structural part of the aeroplane as to constitute said parts a rigid unified whole; i. e., incapable of relative movement or adjustment. In so organizing the engine mounting infinite care and exactness must be exercised to see that the engine bearers are perfectly in line, not only with respect to each other, but with respect also to the fore and aft axis of the machine. As even the slightest "out of alignment" positioning of the engine bed is fatal to the safe and continued operation of an aeronautical motor, obviously the problem of obtaining perfect alignment of the engine bearers is a real consideration in the design and construction of an aeronautical machine. The advantage, therefore, of the present invention is to secure perfect alignment of the engine bearers, and hence the engine bed as a whole, thru adjustment, after assembly, and with a maximum of precision, exactness and ease.

Other objects and advantages of the invention will be hereinafter set forth.

In the drawings, wherein like reference characters denote like or corresponding parts, Fig. 1 is a side elevation of the forward end of an aeroplane fuselage skeleton showing the relation of the engine mounting to the fuselage frame, Fig. 2 is a plan view of the structure illustrated in Fig. 1, and Fig. 3 is a detail longitudinal sectional view of a portion of one of the adjustable draft bars comprised in the engine mounting.

In the embodiment of the invention selected for illustration, 10—10 designate the upper longérons of an aeroplane fuselage, 11—11 the lower longérons thereof, 12 certain of the vertical fuselage struts, and 13 certain of the horizontal fuselage struts, all of said fuselage parts being constructed of metal tubing having welded joints as shown. At the forward end of the fuselage of the aeroplane, the engine mounting, designated in its entirety as 14, is disposed. Said mounting comprises spaced engine bearers 15—15 supported from beneath by means of a supporting framework 16 pivoted as at 17 to the fuselage at points in line with the forward extremities of the lower longérons 11. The particular character of supporting framework, however, forms no part of the present invention, the only requirement being that said frame shall be pivoted as at 17 to the fuselage or other part of the aeroplane with which the engine mounting 14 as a whole is associated. The engine bearers 15 are further supported, from above, by means of spaced draft bars 18—18 pivoted as at 19 to fittings 20 fastened to the respective bearers, and pivoted at at 21 to fittings 22 provided at the forward extremities of the upper longéron 10 of said fuselage. Each draft bar 18—18 (see Fig. 3) is in effect a turnbuckle, in that provision is made for lengthening or shortening the distance between the pivot points 19 and 21 as desired. By separately turning the draft bars 18—18 the engine bed or bearers may be perfectly aligned not only with respect to each other but with respect also to the fore and aft axis of the machine. Morevoer, thru such adjustment, the angular relation of the engine bearers with respect to the fore and aft axis of the machine may be varied. The primary advantage, however, in providing for the adjustment indicated is to admit of a proper lining up of the engine bearers during or after assembly of the fuselage considered as a whole.

In attaining the turnbuckle effect, each draft bar comprises a barrel portion 23 having end portions 24, interiorly threaded, the threads at the opposite ends of said barrel portion being respectively right and left hand threads. Into the threaded ends of the barrel 23 correspondingly threaded shanks 25 are adapted to engage, each shank having threaded thereon a lock-nut 26, thru the adjustment of which the relation of the barrel to the shank portions may be fixed.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. A supporting structure for aeroplane engine beds including a structural member, and means for varying the effective length of said member to adjust said engine bed relatively to said aeroplane.

2. A supporting structure for aeroplane engine beds including a pair of structural members positioned one at each side of the engine bed, and means associated with each said structural member for varying its effective length to adjust said engine relatively to said aeroplane.

3. A supporting structure for aeroplane engine beds including a pair of draft bars positioned one at each side of the engine bed, and means associated with each said draft bar for varying its effective length to adjust said engine bed relatively to said aeroplane.

4. An engine mounting for aeroplanes including spaced engine bearers, a support for the engine bed pivoted at one end to the aeroplane, and means incorporated in said supporting structure and fastened respectively to the engine bearers and to the aeroplane to vary the position of the engine bed thru the adjustment accorded said support.

5. An engine mounting for aeroplanes including an engine bed, an engine bed supporting structure having a portion thereof pivotally fastened to the aeroplane and so related to the engine bed as to support it from beneath and having a portion thereof pivotally fastened to the aeroplane and so related to the engine bed as to support it from above, and means comprised within one of said supporting portions for adjusting the position of the engine bed relatively to the machine.

6. An engine mounting for aeroplanes including an engine bed, an engine bed supporting structure having a portion thereof pivotally fastened to the aeroplane and so related to the engine bed as to support it from beneath and having a portion thereof pivotally fastened to the aeroplane and so related to the engine bed as to support it from above, and means incorporated in and forming a part of said last mentioned portion to adjust said supporting structure, and thru such adjustment alter the position of the engine bed with respect to the fore and aft axis of the machine.

In testimony whereof I hereunto affix my signature.

WILLIAM WAIT. Jr.